(12) United States Patent
Shields

(10) Patent No.: US 7,300,034 B2
(45) Date of Patent: Nov. 27, 2007

(54) THERMAL COMPENSATORY VALVE

(75) Inventor: Sam N. Shields, Boxford, MA (US)

(73) Assignee: Weir Valves & Controls USA Inc., Salem, MA (US)

( * ) Notice: Subject to any disclaimer, the term of this patent is extended or adjusted under 35 U.S.C. 154(b) by 420 days.

(21) Appl. No.: 11/140,018

(22) Filed: May 27, 2005

(65) Prior Publication Data

US 2006/0266963 A1    Nov. 30, 2006

(51) Int. Cl.
*F16K 51/00*    (2006.01)
(52) U.S. Cl. .......................... 251/80; 251/318
(58) Field of Classification Search .............. 251/77, 251/79, 80, 81, 318
See application file for complete search history.

(56) References Cited

U.S. PATENT DOCUMENTS

| | | | | |
|---|---|---|---|---|
| 2,019,193 | A | * | 10/1935 | Mueller ........................ 251/77 |
| 2,200,226 | A | * | 5/1940 | Larson ......................... 251/77 |
| 2,982,512 | A | * | 5/1961 | Hurley ......................... 251/77 |
| 4,338,961 | A | * | 7/1982 | Karpenko ..................... 251/81 |

OTHER PUBLICATIONS

Limitorque Valve Control Type SB and SBD brochure (Jun. 27, 1977); Limitorque Corporation, King of Prussia, PA; printed in U.S.A.

\* cited by examiner

*Primary Examiner*—John Bastianelli
(74) *Attorney, Agent, or Firm*—Lahive & Cockfield, LLP

(57) ABSTRACT

A compensation device for a valve compensates for expansion of a valve stem and/or inertial effects during operation of the valve. The compensation device is preferably integrally provided with the valve. The compensation device includes a first plate rigidly connected to the body of the valve and a second plate movably coupled to the first plate. The second plate is rigidly coupled to the operator assembly housing that houses and controls the movement of the second end of the valve stem, so that movement of the second plate relative to the first plate moves the operator assembly relative to the valve body to compensate for expansion of the valve stem and/or inertial forces. The first plate and second plate remain in radial alignment during the relative movement. One or more biasing elements, such as spring assemblies, are used to connect the first plate and the second plate to bias the plates in a default position, absorb forces and allow for movement of the second plate relative to the first plate. The spring assembly preferably comprises an array of Belleville washers.

12 Claims, 7 Drawing Sheets

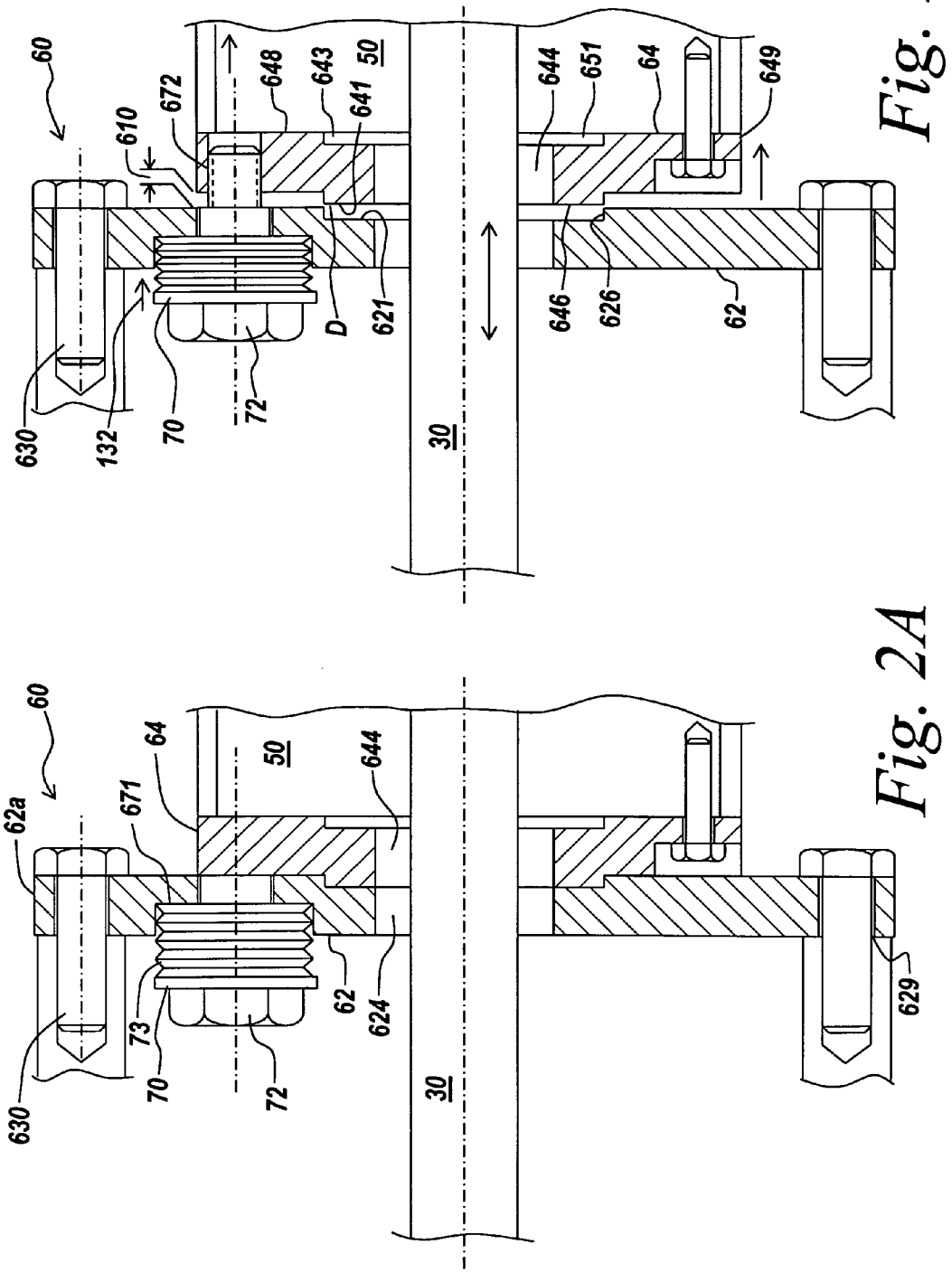

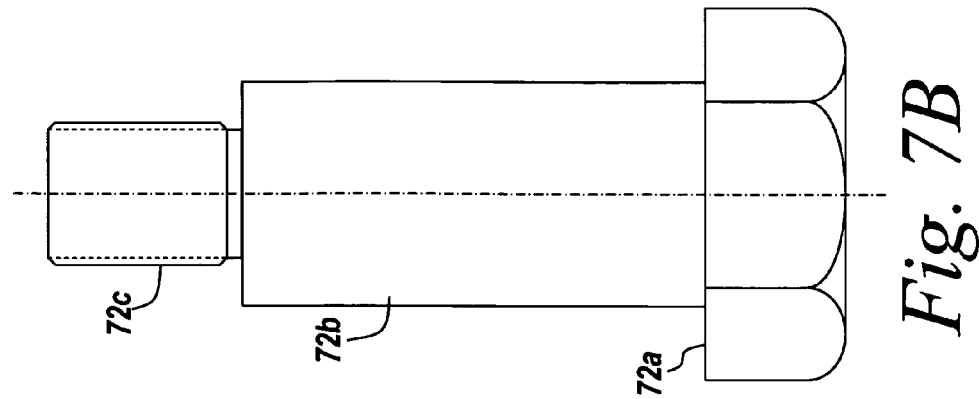
Fig. 7B
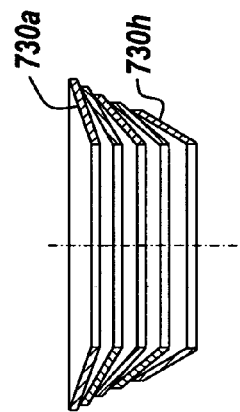
Fig. 7A
Fig. 8B
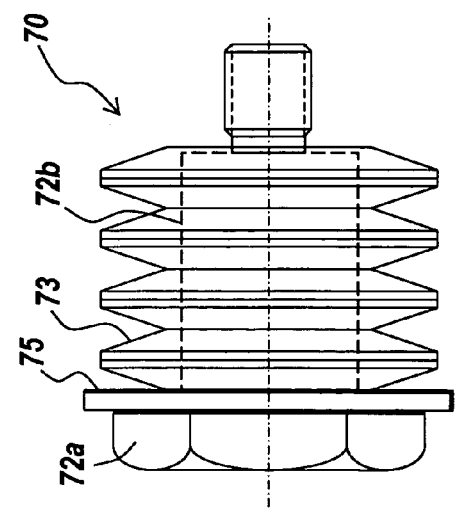
Fig. 6
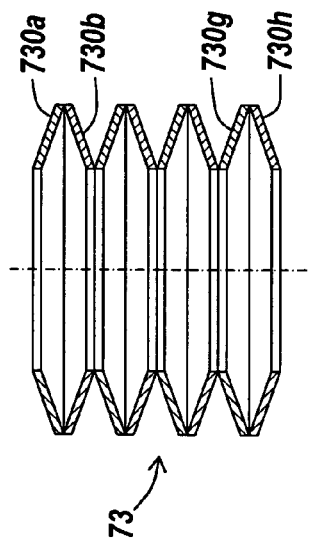
Fig. 8A

THERMAL COMPENSATORY VALVE

FIELD OF THE INVENTION

The present invention relates to valves for controlling flow through a flow passage. More particularly, the present invention relates to a compensation device for valves used in high-temperature applications to compensate for thermal expansion of a valve stem.

BACKGROUND OF THE INVENTION

Valves are used to control flow in a variety of applications. In certain applications, such as power plant applications, valves, which are generally very stiff and inflexible structures, are exposed to high temperature environments that can compromise the operation of the valve. In particular, high temperatures may cause a valve stem to expand, which may lead to valve failure. For example, the expansion of the valve stem results in damage to components of the valve, such as the seat, or bending of the stem under excessive compressive stress caused by the increased length of the stem.

For valves used in high temperature environments, the internal service temperature of a valve can reach up to about 1100 degree Fahrenheit when the valve is in an open position. As a result, the valve body and most internal components of the valve are exposed to extreme heat and have filly expanded thermally, while a substantial length of the valve stem protrudes from the valve body and is thus exposed to the cooler ambient temperature. When the valve is closed, a poppet at the end of the valve stem is pushed hard against the body seat to block fluid flow. During closing, a cooler portion of the stem previously exposed to the cooler ambient exterior is now inserted from the cooler ambient exterior into the 1100 degree Fahrenheit environment and begins to thermally expand. Because there is no backlash in the drive train and the stem threads and gearing used to operate the valve stem are self-locking, the expansion of the stem must be accommodated in some manner. An uncompensated expansion of the valve stem may result in significant damage to the valve.

Prior systems for accommodating an expansion of a valve stem are implemented in the operator assembly for a valve, and can be expensive and fairly complicated to implement.

In addition, inertial effects due to opening and closing of the valve can lead to damage of the valve components absent compensation.

SUMMARY OF THE INVENTION

The present invention provides a compensation device for a valve that may compensate for expansion of a valve stem and/or inertial effects during operation of the valve. The compensation device is preferably integrally provided with the valve. The compensation device includes a first plate rigidly connected to the body of the valve and a second plate movably coupled to the first plate. The second plate is rigidly coupled to the operator assembly housing that houses and controls the movement of the second end of the valve stem, so that movement of the second plate relative to the first plate moves the operator assembly relative to the valve body to compensate for expansion of the valve stem and/or inertial forces. The first plate and second plate remain in radial alignment during the relative movement. One or more biasing elements, such as spring assemblies, are used to connect the first plate and the second plate to absorb forces and allow for movement of the second plate relative to the first plate. The spring assembly preferably comprises an array of Belleville washers.

According to a first aspect of the invention, a compensated valve is provided. The compensated valve comprises a valve body including a valve stem and a valve seat, a poppet connected to a first end of the valve stem and configured to selectively engage the valve seat to selectively block fluid flow through the valve body, a first plate rigidly connected to the valve body and a second plate movably coupled to the first plate. The second plate is rigidly connected to an operator assembly operating on a second end of the valve stem. Relative movement between said first plate and said second plate may compensate for change in length of said valve stem.

According to another aspect of the invention, a device for compensating for valves is provided. The devices comprises a spring-loaded connector for movably connecting a first plate to a second plate. The first plate is rigidly fixed to an operator assembly housing a valve stem and surrounds an intermediate portion of the valve stem and the second plate is rigidly connected to a valve body.

According to still another aspect of the invention, a device for compensating for valve stem expansion comprises a first plate having a first axially extending central hole, a second plate mating with the first plate and having a second axially extending central hole aligned with the first axially extending hole so as to allow a valve stem to pass therethrough and a spring-loaded connector coupling the first plate to the second plate. The spring-loaded connector includes a protrusion anchored to the first plate and extending through the second plate, and a spring surrounding the protrusion on a side of the second plate opposite the first plate.

According to a final aspect of the invention, a method of compensating for expansion of a valve stem is provided, which comprises the steps of moving a first plate away from a second plate to increase a distance between a valve body receiving a first end of the valve stem and an operator assembly housing a second end of the valve stem and maintaining a radial alignment of the first plate relative to the second plate during the step of moving.

BRIEF DESCRIPTION OF THE FIGURES

FIG. 2A is a detailed side view of an embodiment of the compensation device in a default position where no compensation is provided.

FIG. 2B is a detailed side view of the compensation device of FIG. 2A during compensation mode, where a gap is created between two plates in the valve.

FIG. 6 illustrates an embodiment of a spring assembly used in a compensation device for a valve according to an illustrative embodiment of the invention.

FIGS. 7A and 7B are detailed views of the shoulder screw used in the spring assembly shown in FIG. 6.

FIG. 8A illustrates an embodiment of the spring used in the spring assembly of FIG. 6.

FIG. 8B illustrates an alternative embodiment of the spring used in the spring assembly of FIG. 6.

DETAILED DESCRIPTION OF THE INVENTION

The present invention provides a compensation device for a valve that may be integrated with the valve components. The present invention will be described below relative to certain illustrative embodiments. Those skilled in the art will appreciate that the present invention may be implemented in a number of different applications and embodiments and is not specifically limited in its application to the particular embodiments depicted herein.

Figure 1:
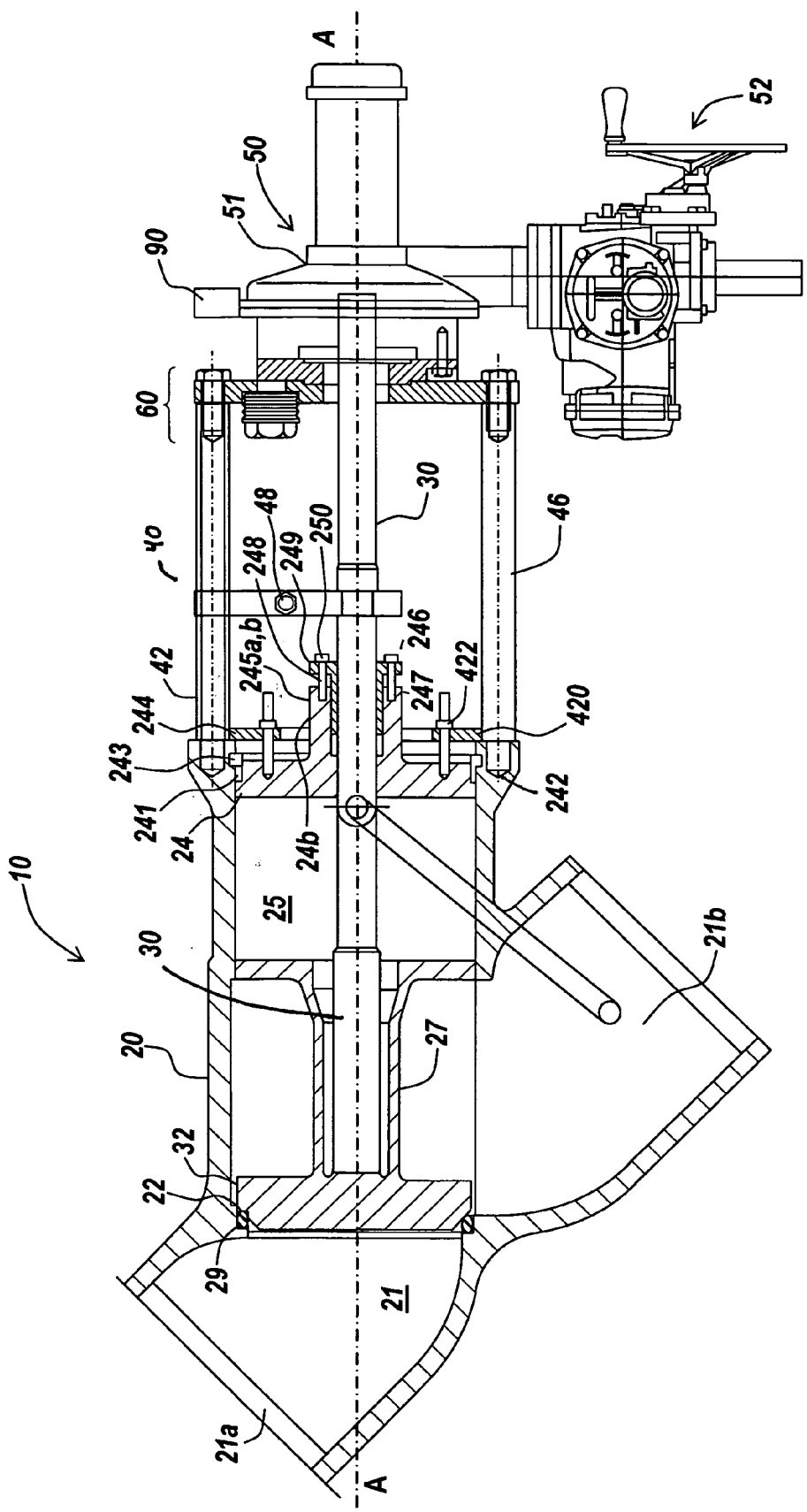
FIG. 1 illustrates an embodiment of a compensatory valve according to an illustrative embodiment of the invention.

FIG. 1 illustrates a valve 10 suitable for implementing an illustrative embodiment of the invention. The valve may be used in any suitable application, including, but not limited to, utilities, power generation, industrial and process applications. The illustrative valve is particularly suitable for use in high-temperature environments, such as power plants. The components of the valve are preferably formed using alloys of high hardness characterized by excellent corrosion and wear resistance, though one skilled in the art will recognize that any suitable materials may be used.

The illustrative valve 10 includes a compensation device providing compensation during operation of the valve. For example, the compensation device may accommodate an expansion in the valve stem due to exposure to high temperatures, and/or inertial effects resulting from opening and/or closing the valve. The compensation device may be integrated with the valve components and ensures smooth, efficient operation of the valve, as described in detail below.

The valve 10 shown in FIG. 1 includes a valve body 20 defining a flow path 21 therethrough for allowing fluid flow when the valve is in an open position. The flow path 21 includes an inlet passage 21a into and an outlet passage 21b out of the valve body 20, but may include multiple inlets and/or multiple outlets. The valve body 20 includes a valve seat 22 for receiving a poppet 32 or other suitable closure means to selectively block fluid flow through the flow path 21. As shown in FIG. 1, the poppet fits into the seat 22 within the body 20 to provide a tight shutoff when the valve is in a closed position. A seal 29 may be provided at the interface between the poppet 32 and the valve seat 22 to facilitate sealing between the poppet 32 and the valve seat 22 and effectively prevent leaks when the valve 10 is in a closed position.

A valve stem 30 for axially moving the poppet 32 into and out of engagement with the valve seat 22 is also provided. The valve stem 30 preferably comprises an elongated cylindrical body having the poppet 32 integrally formed on or rigidly fixed to a first end thereof. The valve stem 30 reciprocates along the longitudinal axis A-A of the valve body 20 to selectively open and close the valve 10. The illustrative valve body 12 may further include ribs or other suitable guidance means 27 for guiding the reciprocating valve stem 30 and facilitating movement of the poppet 32 into and out of engagement with the valve seat 22.

The stem 30 is axially movably connected to the valve body and extends from the interior 25 of the valve body 20 through a cover 24 sealing the interior of the valve body 20. The valve stem 30 continues to extend externally through a yoke 40 mounted to the valve body 20 to an operator assembly 50. The operator assembly 50 for the valve 10 receives the second, distal end of the stem 30 and includes controls for selectively moving the valve stem 30 and associated poppet 32 along the axis A-A. The operator assembly 50 moves the stem 30 and poppet 32 between an open position, with the poppet 32 spaced from the valve seat 22 and permitting fluid flow through the valve 10, and a closed position, where the poppet engages the valve seat 22 and blocks fluid flow. In the illustrative embodiment, the valve stem 30 is threaded on the second end to allow the operator assembly 50 to reciprocate the valve stem via a rotating movement about the longitudinal axis A-A.

The cover 24 for the valve body 20 generally comprises a sealed, disc-shaped plate that sealingly engages the valve body 20 to form a sealed interior 25 within the valve body 20. The illustrative cover 24 includes a first sealing assembly for sealing about the periphery of the cover 24. In addition, the cover 24 includes a second sealing assembly for sealing about the valve stem 30 extending through the cover 24.

The illustrative first sealing assembly of FIG. 1 for sealing the periphery of the cover 24 includes a first seal ring 241 formed of graphite or other suitable material, a backing ring 242 axially rearward of the first seal ring 241 and formed of steel or other suitable material and a load key 243 disposed axially rearward of the seal rings.

As shown in FIG. 1, the cover 24 includes an annular protrusion 24b surrounding the stem 30 and including the second seal assembly for sealing about the valve stem 30. The second sealing assembly includes a bushing 244, a pair of wiper rings 245a, 245b, preferably formed of graphite or other suitable material, a composite end ring 246, which is preferably formed of carbon or other suitable material, and packing 247, which is preferably formed of graphite or other suitable material. A gland 248, a gland plate 249 and a fastening device 250 are also provided for securing the sealing assembly to the cover 24. The secondary sealing assembly allows for reciprocating movement of the valve stem while ensuring that the valve body interior 25 remains sealed from the environment. The details of the seal assemblies are well known to one of ordinary skill in the art and can be modified without departing from the claimed invention.

The illustrative yoke 40 comprises a plurality of rods, including rods 42 and 46, for protecting the stem 30 in the area between the valve body 20 and the operator assembly 50 while allowing access to the cover 24. The yoke 40 may have any suitable size, configuration and number of rods in accordance with the teachings of the invention, and is not limited to the illustrative embodiment. An anti-rotation device 48 in the yoke 40 ensures alignment of the valve stem 30 with the longitudinal axis of the valve body 20 while preventing rotation of the stem 30 during operation of the valve. In addition, the illustrative valve 10 includes a yoke connector for rigidly connecting the yoke 40 to the valve body 20. The illustrative yoke connector includes a locking plate 420 and fastening devices 422 for locking the yoke 40 to the valve body 20 and/or cover 24, though one skilled in the art will recognize that any suitable means for rigidly connecting the yoke 40 to the valve body 20 may be utilized.

The operator assembly 50 receives the second end of the valve stem 30 and selectively reciprocates the valve stem 30 to move the poppet 32 into and out of engagement with the valve seat 22, thereby selectively opening and closing the passageway 21 through the valve 10. The illustrative operator assembly 50 includes a drive box 51, gears, a handwheel 52 and other components known to one of ordinary skill in the art. The details and operation of the operator assembly are known to those of ordinary skill in the art and are not described further.

The valve 10 further includes an integrated compensating device 60 for providing compensation for thermal expansion by the stem, as well as, or alternatively, inertia effects. For example, the integrated compensating device accommodates an increase in the length of the valve stem that may occur when a cooler portion of the stem 30 is inserted into the high-temperature valve interior 25 during closing of the valve 10. The compensating device 60 is provided as part of the valve by a valve designer, rather than as a separate component, for example, as part of the valve operator 50.

The illustrative compensating device 60 is provided at an intermediate portion of the valve stem 30. The compensating device 60 is preferably disposed at the axially rearward end of the yoke 40 (away from the valve body 20), though one skilled in the art will recognize that the compensating device may be provided at any suitable intermediate location along the valve stem 30.

Referring to FIGS. 2A and 2B, an illustrative embodiment of the compensating device 60 comprises a first plate 62 rigidly mounted to the axially rearward end of the yoke 40 and a second plate 64 movably coupled to the first plate (in a manner further explained later) and controllably movable by a selected distance in the axial direction relative to the first plate 62. The second plate 64 is rigidly connected to the operator assembly 50, which contains the second end of the valve stem 30, so that movement of the second plate 64 relative to the first plate 62 controllably moves the operator assembly 50 and, thus, the second end of the valve stem 30, relative to the valve body 20 along the axis A-A to accommodate an expansion of the valve stem and/or compensate for inertial effects.

According to the illustrative embodiment of FIGS. 2A and 2B, the second plate 64 and the first plate 62 have matching interfacing surfaces 641, 621, respectively, that mate when the valve 10 is in a default position, shown in FIG. 2A. However, when the valve is in a compensation position, as shown in FIG. 2B, the second plate 64 separates from the first plate 62 to create a gap 610 between the main bodies of the plates 62, 64, without entirely uncoupling the plates. The gap 610 is preferably about equal to the amount of expansion of the valve stem 30, which is generally between about 0.2 and about 0.25 inches. The gap 610 increases the distance between the poppet 32 and the second end of the stem to allow for an increase in stem length while preventing application of damaging forces to other components of the valve.

The compensation device may compensate for expansion of the valve stem 30, as shown in FIG. 2B. In this mode, the expansion of the valve stem pushes against the operator assembly 50 at the second end of the valve stem. Due to the movable nature of the second plate 64 and the first plate 62 relative to each other in the axial direction, the increased length of the valve stem may be accommodated by separating the second plate 64 from the first plate 62, thereby increasing the distance between the valve body 20, including the valve seat 22, and the operator assembly 50, including the second end of the valve stem 30.

The second plate 64 maintains engagement with the first plate 62 throughout all positions (i.e., in both the compensation mode and the default mode) via any suitable engagement means that permits the relative axial movement of the plates. Preferably, the engagement means maintains the radial alignment between the plates in the default position, the compensation position and positions in between the two end positions, as described in detail below.

Figure 3B:
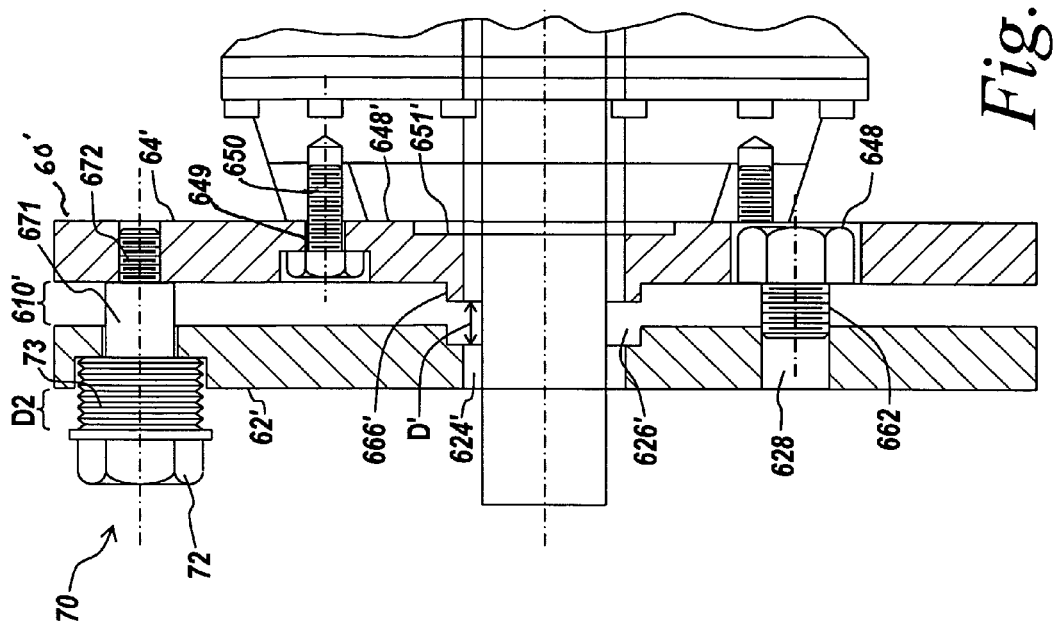
FIG. 3B is a side view of the compensation device of FIG. 3A during compensation mode.
Figure 3A:
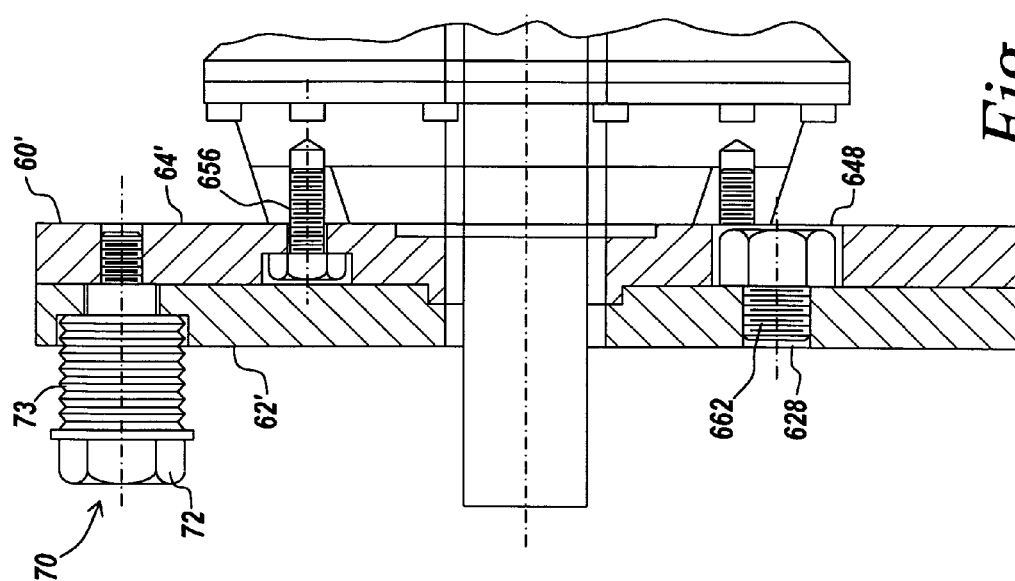
FIG. 3A is a detailed side view of another embodiment of the compensation device of the present invention in a default position.

FIGS. 3A and 3B illustrate another embodiment of a compensation device 60' in a default mode and a compensation mode, respectively. The similar components of the compensation devices 60, 60' are designated with like numbers, differentiated by a prime. The compensation device of FIGS. 2A and 2B includes a second plate 64 that is smaller in diameter than the first plate 62. In the compensation device 60' of FIGS. 3A and 3B, the second plate 64' is substantially equal in diameter to the first plate 62'. One skilled in the art will recognize that the cooperating first plate 62 or 62' and second plate 64 or 64' may have any suitable relative size, shape and configuration that facilitates controlled axial movement relative to each other.

Figure 4:
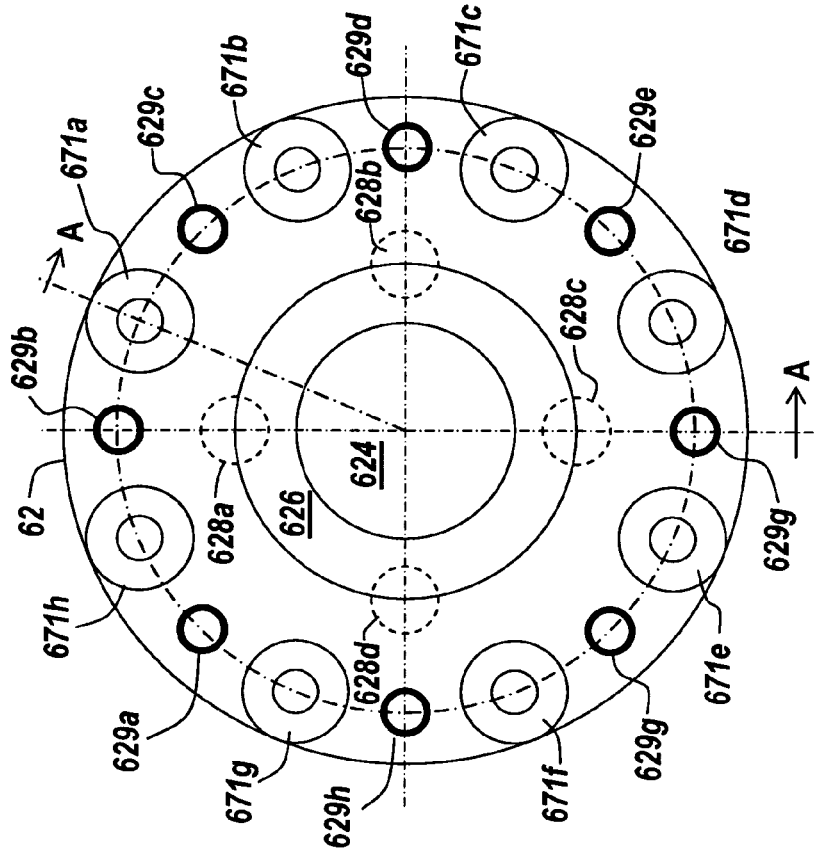
FIG. 4 is a front view of an embodiment of the first plate of the valve of FIG. 1.

The illustrative first plate 62, a frontal view of which is shown in FIG. 4, has a substantially disc-shaped body including a central axial hole 624 through which the valve stem 30 extends. The axially rearward facing surface 621 of the first plate is configured to mate with the second plate 64. As shown in FIGS. 2A-2B and 4, the rearward facing surface 621 includes a central annular recess 626 for slidably receiving a corresponding annular protrusion 646 on the axially forward facing surface 641 of the second plate 62. The mating annular protrusion 646 and annular recess 626 maintain engagement even during separation of the main portions of the plates to maintain radial alignment of the plates. Preferably, the depth D of the mating protrusion 646 and/or recess 626 is less than the size of the gap 610 to prevent disengagement of the plates during compensation. One skilled in the art will recognize that any suitable means for radially aligning the plates while allowing relative axial movement may be used in accordance with the teachings of the invention.

The first plate 62 further includes yoke holes 629a-629h for rigidly connecting the first plate to the yoke 40, for example using bolts 630 as shown in FIGS. 2A and 2B or other suitable fixation element. The first plate 62 is preferably mounted to the axially distal ends of the yoke rods 42, 46, though one skilled in the art will recognize that any suitable means and position may be used to rigidly fix the first plate 62 to the yoke 40, thereby rigidly connecting the first plate 62 and the valve body 20.

Figure 5:
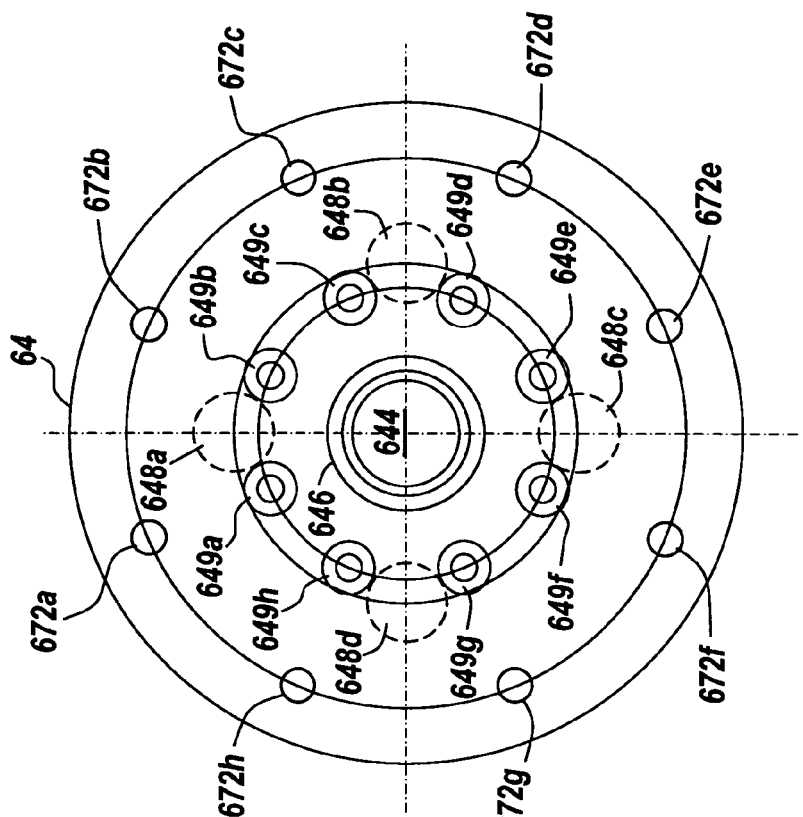
FIG. 5 is a front view of an embodiment of the second plate of the valve of FIG. 1.

The illustrative second plate 64, a frontal view of which is shown in FIG. 5, includes a substantially disc-shaped body including an axially extending central hole 644 for receiving the valve stem, which extends therethrough towards the operator assembly 50. The axially extending central hole 644 of the second plate 64 aligns with the axially extending hole 624 of the first plate when the valve is assembled to allow passage of the valve stem 30. The second plate 64 further includes the annular protrusion 646 surrounding the central hole 644, which projects from the axially forward facing surface 641 and is configured to slidably mate with the central annular recess 626 of the first plate 62. The axially rearward facing surface 648 of the second plate 64 includes a central annular recess 643 sized and configured to receive a seal, such as an o-ring 651, for sealing about the valve stem 30. The illustrative second plate 64 further includes operator holes 649a-649h configured to received bolts 650, as shown in FIGS. 3A and 3B, or other suitable means for securing the second plate 64 to the operator assembly 50, though one skilled in the art will recognize that any suitable means for rigidly connecting or mounting the second plate to the operator assembly 50 may be used in accordance with the teachings of the invention.

According to one embodiment, an engagement means for movably coupling the first plate 62 and the second plate 64 may comprise joints that facilitate separation of the plates up to a predetermined distance while maintaining radial alignment of the plates 62, 64 relative to each other and relative to the other valve components. For example, as shown in FIGS. 3A-3B and FIGS. 4 and 5 the illustrative first plate 62 may further include circumferentially spaced coupling holes 628a-628d for slidably receiving a protrusion 653, shaft, or other coupling means connected to the second plate 64. The illustrative second plate 64 includes circumferentially spaced coupling holes 648a-648d that align with the circumferentially spaced coupling holes 628a-d when the plates mate with each other. A protrusion, shaft or other coupling means, illustrated as bolts 662 in FIGS. 3A-3B, extend through the aligned holes to slidably mate the plates, while allowing limited axial movement. The bolts thus facilitate selected, aligned axial movement of the plates 62, 64 relative to each other. Other types of mating recesses or holes and protrusions that provide alignment while allowing relative axial movement may be used in accordance with the teachings of the invention. One skilled in the art will recognize that any suitable engagement means for maintaining alignment while allowing axial, sliding movement between the two plates 62, 64 may be used in accordance with the teachings of the invention, and that the means for slidably mating the plates is not limited to the embodiments shown in FIGS. 2A-5.

According to an illustrative embodiment, the compensation device 60 or 60' means further, or alternatively, includes one or more spring assembles 70 for biasing the compensation device 60 in a default mode where no compensation is provided. The spring assembly 70 (or assemblies) further absorbs forces within the valve and controls the movement of the second plate 64 relative to the top plate 62. FIG. 6 illustrates an embodiment of a spring assembly 70 used in the compensation devices 60 and 60' shown in FIGS. 2A-3B. The spring assembly 70 according to the illustrative embodiment of the invention includes a shoulder screw 72, illustrated in detail in FIGS. 7A and 7B, having a head portion 72a and a shaft portion 72b for coupling the first plate 62 to the second plate 64. The shaft portion 72b may form an anchoring portion 72c at a distal end for anchoring the screw 72 to one of the plates (the second plate 64 in the illustrative embodiment). The head portion 72a shown in FIGS. 7A and 7B has a substantially hexagonal shape, though one skilled in the art will recognize that the head portion 72a can have any suitable size, shape and/or configuration. A spring 73 or other suitable biasing element is also provided and may surround the shaft portion 72b of the shoulder screw 72. A washer 75 may also be provided on the shaft portion 72b between the spring 73 and the head portion 72a.

The spring assemblies 70 may be provided in addition to an engagement means, such as the coupling holes 628, 648 and bolts 662 shown in FIGS. 3A and 3B. Alternatively, the spring assemblies 70 may substitute as a primary engagement mechanism for slidably mating the plates, as shown in FIGS. 2A and 2B.

The illustrative first plate 62 and the illustrative second plate 64 include peripheral holes 671a-h and 672a-h, respectively, disposed about the perimeter of the plates for receiving the spring assemblies 70. Each peripheral hole 671a-h on the first plate 62 aligns with a peripheral hole 672a-h of the second plate, and the shaft portion 72b of each spring assembly 70 extends through each of the aligned holes. A distal end of the shaft portion 72b is anchored in the peripheral hole of the second plate 64. In the illustrative embodiment, the peripheral holes of the first plate 671a-h are larger than the anchoring peripheral holes of the second plate and are sized and configured to seat the spring 73.

The spring assembly 70 prevents inadvertent movement of the plates, unless an axial force, for example, from an expansion of a valve stem, is applied. When the axial force pushes the second plate 64 away from the first plate 62, the head portions 72a of the screws are pulled by the second plate and approach the surface of the first plate, compressing the springs 73, as shown in FIGS. 2B and 3B. The compression of the springs 73 thus controls and enables the relative movement of the plates, as well absorbs forces generated by an expansion of the valve stem and/or inertial effects due to opening and/or closing of the valve. The compression of the springs 73 thereby reduces the force applied to the valve components, reducing damage and improving overall operation of the valve. For example, the separation of the plates and compression of the springs prevents the valve stem from applying damaging compressive forces to the valve seat 22.

The plates 62, 64 are configured so that the engagement means prevents total disengagement of the plates even when the springs 73 reach an ultimate compression distance. For example, the depth D of the mating annular protrusion and annular recess is preferably larger than the ultimate compression distance D2 of the springs 73, so that even when the springs are fully compressed (the springs are bottomed) and the plates have reached their maximum separation distance, the annular protrusion and recess remained engaged and maintain the plates in radial alignment with each other and with the other valve components.

Preferably, the compensation device compensates for both valve stem expansion and inertial forces, so that the maximum separation 610 undergone by the plates during valve expansion leaves additional compression space in the springs 73 to compensate for inertial effects caused by a load on the valve. The spring compression preferably does not exceed limits of the gear box thrust rating in the gear box of the operator assembly 50.

Each of the springs 73 preferably comprises a Belleville spring assembly, though one skilled in the art will recognize that any suitable biasing element may be used in accordance with the teachings of the invention. In the illustrative embodiments of the invention, each spring 73 includes an array of eight washers, though one skilled in the art will recognize that the springs may have any suitable size, shape and configuration. For example, FIGS. 8A and 8B illustrate different embodiments of a Belleville spring assembly suitable for use in the compensation device of the illustrative embodiment of the invention. As shown, the spring 73 may comprise an array of Belleville washers 730a-730h stacked in series, as shown in FIG. 8A, or in parallel, as shown in FIG. 8B.

The illustrative valve includes eight spring assemblies 70 disposed about the periphery of the first plate 62 and the second plate 64, though one skilled in the art that will recognize that the spring assembly may comprise any suitable size, number and configuration of springs or other biasing elements.

According to an alternate embodiment, the spring assembly 73 comprises a single spring disposed about and concentric with about the valve stem 30 to provide compensation.

While the illustrative spring assemblies 73 are shown extending from the first plate 62 towards the yoke 40, it is within the scope of the invention for the spring assemblies to also, or alternatively, be provided to extend from the second plate 64 towards the operator assembly 50 in order to compensate for closing forces on the valve.

The illustrative valve 10 further includes an indicator device 90 for providing feedback to an operator or observer regarding the compensation device. The indicator device may provide a visual indication of the amount of compensation provided, for example, by showing the amount of compression of the springs 73, or regarding another parameter.

Figure 9:
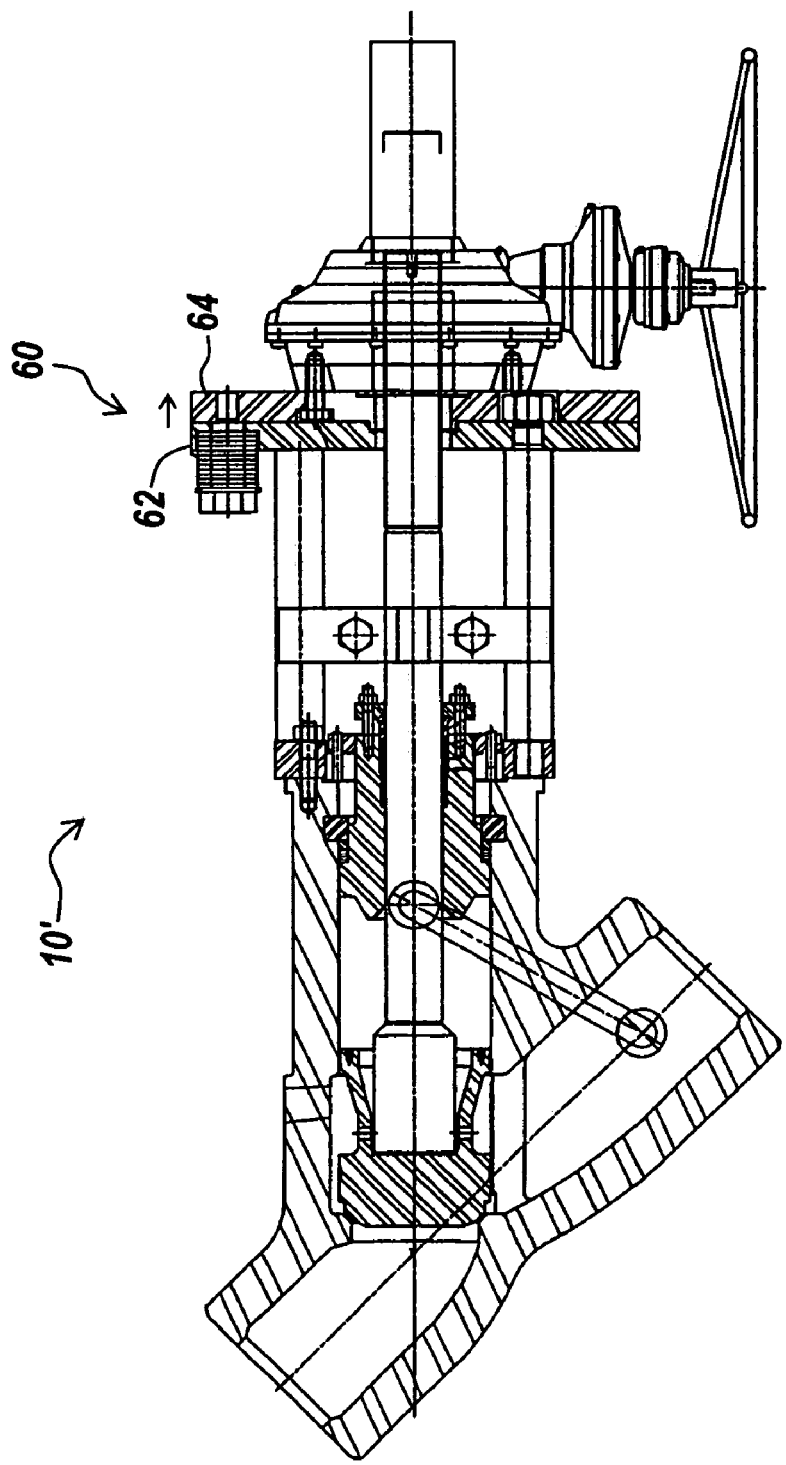
FIG. 9 illustrates another valve incorporating a compensation device according to another illustrative embodiment of the invention.
Figure 10:
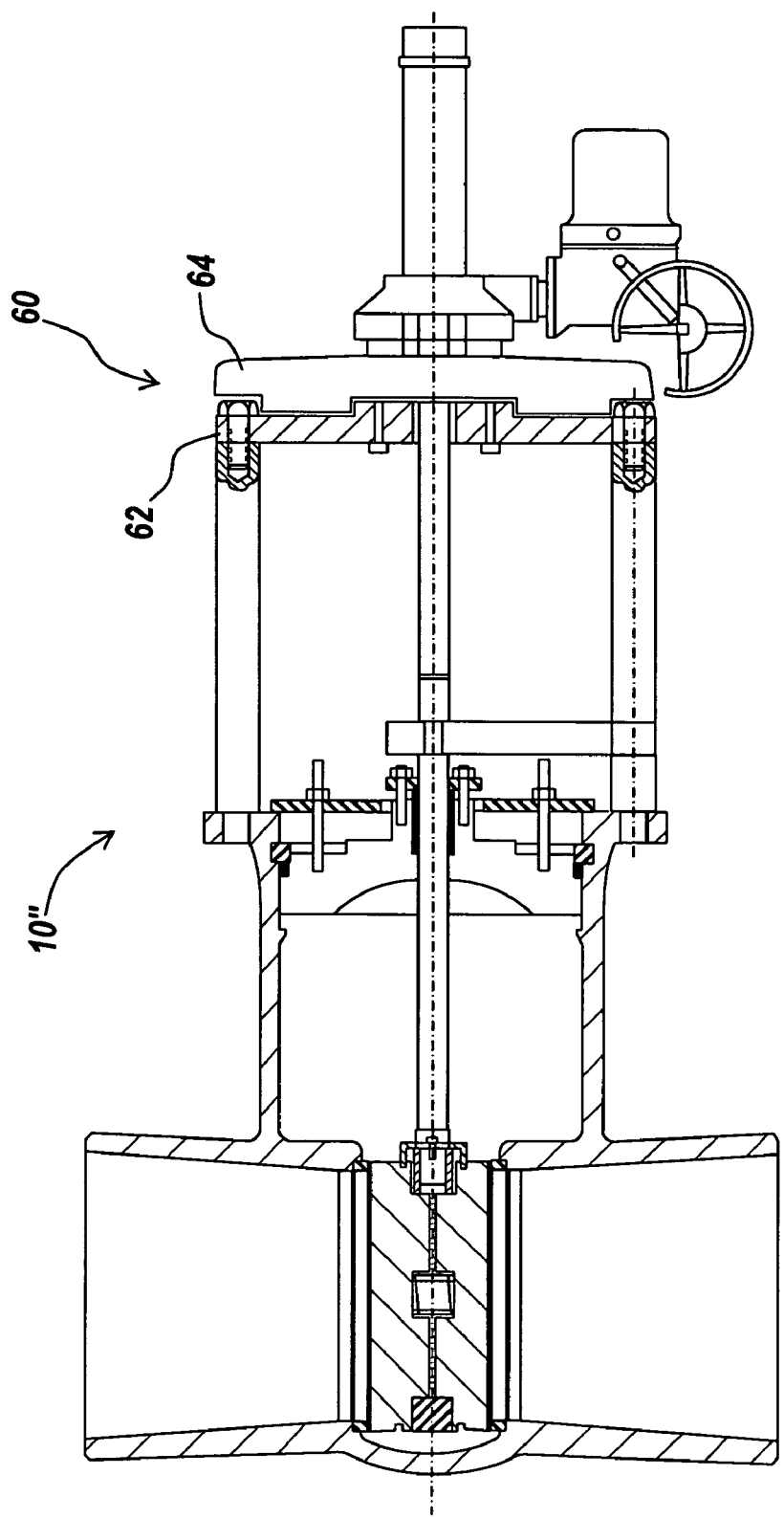
FIG. 10 illustrates another valve incorporating a compensation device according to still another illustrative embodiment of the invention.

One skilled in the art will recognize that the compensation device implemented according to the teachings of the invention may be implemented in any suitable valve subject to thermal expansion and/or inertial effects and is not limited to the globe valve of FIG. 1. For example, FIGS. 9 and 10 illustrate valves 10' and 10" each incorporating a compensation device 60 including a pair of axially movable plates 62, 64.

The integrated compensation device of the illustrative embodiment of the invention provides significant advantages over valves in the prior art. The compensation device effectively and efficiently compensates for high inertia loads caused by fast closure of the valve, opening of the valve and for expansion of the valve stem due to exposure to high temperatures. The compensation device may be mounted directly to the valve and provided by the valve designer during assembly of the valve. Alternatively, the compensation device can be retrofit to an existing valve. The compensation device is designed for manufacturability, and is relatively low cost to implement.

Numerous modifications and alternative embodiments of the invention will be apparent to those skilled in the art in view of the foregoing description. Accordingly, this description illustrative only and is for the purpose of teaching those skilled in the art the best mode for carrying out the invention. Details of the structure may vary substantially without departing from the spirit of the invention.

The invention claimed is:

1. A compensated valve, comprising
    a valve body including a valve stem and a valve seat;
    a poppet connected to a first end of the valve stem and configured to selectively engage the valve seat to selectively block fluid flow through the valve body;
    a first plate rigidly connected to the valve body; and
    a second plate movably coupled to the first plate and rigidly connected to an operator assembly operating on a second end of the valve stem, whereby relative movement between said first plate and said second plate may compensate for a change in length of said valve stem.

2. The compensated valve of claim 1, wherein the first plate and the second plate each includes a central opening for allowing passage of the valve stem therethrough, wherein the central openings are aligned with each other.

3. The compensated valve of claim 1, wherein the second plate and the first plate are axially movable relative to each other and remain radially aligned during axial movement of the plates relative to each other.

4. The compensated valve of claim 1, wherein the first plate and the second plate include matching contoured surfaces configured to interface with each other to slidably mate the first plate and the second plate.

5. The compensated valve of claim 1, wherein the one of the first plate and the second plate includes an annular recess surrounding a central opening and the other of the first plate and the second plate includes an annular protrusion configured to slidably mate with the annular recess of the other plate.

6. The compensated valve of claim 1, further comprising a spring assembly for coupling the first plate and the second plate and biasing the first plate and the second plate in a default position.

7. The compensated valve of claim 6, wherein the spring assembly comprises:
    a protrusion anchored to one of the first plate and the second plate and extending through the other of the first plate and the second plate; and
    a spring surrounding the protrusion.

8. The compensated valve of claim 7, wherein the protrusion includes a head portion for retaining the spring around the protrusion, such that separation of the plates compresses the spring.

9. The compensated valve of claim 8, further comprising an indicator for measuring and providing an indication to an observer of an amount of compression of the spring.

10. The compensated valve of claim 7, wherein the spring comprises an array of Belleville washers.

11. The compensated valve of claim 6, wherein the valve comprises a plurality of spring assembly distributed circumferentially about the interface between the first plate and the second plate.

12. The compensated valve of claim 1, wherein the first plate is mounted to a yoke extending from the valve body.

* * * * *